United States Patent Office 3,682,659
Patented Aug. 8, 1972

---

3,682,659
MARSHMALLOW CONFECTION
Henry E. Jurczak, Chicago, and Edward S. Olney, Deerfield, Ill., assignors to Kraftco Corporation, New York, N.Y.
No Drawing. Filed Apr. 30, 1970, Ser. No. 33,519
Int. Cl. A23g 3/00
U.S. Cl. 99—134 A     3 Claims

ABSTRACT OF THE DISCLOSURE

Preparing a flowable, spoonable marshmallow mix having 76–80 percent solids and a density of from about 250 to about 425 grams per pint by whipping a syrup of hydrated microcrystalline cellulose, at least one sugar and a whipping agent.

---

The present invention relates to a whipped confection and more particularly relates to a flowable marshmallow having improved properties and to a method for making same.

Marshmallow is a well-recognized confection which is manufactured by whipping a syrup at temperatures at or above room temperature to produce a light, fluffy, white emulsion of air in the syrup mixture. A whipping agent such as egg albumen may be added to the syrup to aid in providing desired whipping properties. The density (weight per unit volume) of marshmallow is frequently expressed as grams per pint and may range from between about 110 and 230 grams per pint. At the densities of from about 140 to about 150 grams per pint the marshmallow usually has a solid elastic body due to close packing of air cells in the continuous phase. This is the form usually associated by the consumer with the term "marshmallow." As the bulk density is increased, the marshmallow undergoes a change from a solid elastic body through a chewy texture and becomes semi-solid in character. Semi-solid marshmallow products are frequently referred to as "marshmallow creme." Marshmallow cremes have generally been produced with densities of from about 180 to about 230 grams per pint. Marshmallow creme products are generally considerd to have a "spoonable" consistency. By "spoonable" consistency is meant a product with a semi-solid, plastic texture which retains its shape after being removed from a container with a spoon.

Marshmallow creme, upon aging, becomes progressively coarse in texture due to coalescense of air cells. Also, there occurs a syneresis or exudation of liquid from within which causes an appearance of separate liquid phase on the bottom of the marshmallow creme container. This problem becomes more and more acute as the density increases within the above indicated range and as the solids content of the marshmallow is decreased. At the upper level of bulk density in the range, destabilization of the marshmallow creme becomes a problem and the marshmallow creme product separates more rapidly into two phases. Moreover, to produce a flowable marshmallow product, the density of the marshmallow must be greater than about 230 grams per pint. It would be desirable to produce a spoonable marshmallow with lower solids level which is also flowable, but it has been considered difficult to produce such product due to the difficulty of stabilizing a marshmallow product when the density of the marshmallow is above about 230 grams per pint.

Accordingly, an object of the present invention is to provide a spoonable, flowable marshmallow. Another object of the invention is to provide a method for the manufacture of marshmallow which has a density greater than marshmallow available heretofore. Yet another object is to provide a stable marshmallow which has a greater density and a lower solids level than has been available heretofore and is flowable. Other specific objects and advantages of the invention will be apparent from a careful reading of the following detailed description.

In accordance with the present invention, a stabilizing agent is provided and the stabilizing agent is hydrated by providing an aqueous dispersion of the stabilizing agent. The aqueous dispersion is then formed into a syrup by the addition of sugar and by heating. A whipping agent is then added to the syrup and the resultant mixture is whipped to provide a spoonable, flowable marshmallow product having a density greater than about 250 grams per pint and a solids content of less than about 80 percent. The term "spoonable, flowable" marshmallow product, as used herein, refers to a confection product made with marshmallow materials which may be spooned from a container and which will flow from the spoon. The depression left in the container by the product which is removed will gradually be filled in by flow of the surrounding product. This is distinguishable from the consistency of heretofore known marshmallow creme which does not flow.

The marshmallow product may have a density of from about 250 grams per pint to about 425 grams per pint. As previously indicated, when a marshmallow product is prepared having a density within the above indicated range, there is a tendency for the marshmallow product to destabilize and separate into a liquid phase and a solid phase. This problem is accentuated when the solids content is lowered below about 80 percent. The stabilizing agent of the present invention aids in providing desirable texture in the marshmallow product and stabilizes the marshmallow to prevent separation of liquid therefrom.

The whipping agent may be any conventional whipping agent previously employed in the manufacture of marshmallow. A preferred whipping agent is egg albumen. The egg albumen may be dried or may be from fresh egg white. In the event that dried egg albumen is used, the dried egg albumen is reconstituted with water prior to the addition of the egg albumen to the syrup.

The stabilizing agent of the invention is colloidal cellulose crystallite aggregates, hereinafter sometimes referred to as micro-crystalline cellulose. A suitable method for preparing microcrystalline cellulose is described in U.S. Pat. No. 2,978,446. The stabilizing agent is used at a level sufficient to act as a stabilizer for the flowable marshmallow product. In general, a level of stabilizing agent of from about 0.5 percent to about 5.0 percent by weight of the marshmallow product is sufficient to stabilize the flowable marshmallow product.

Microcrystalline cellulose has a slight negative charge when placed in an aqueous dispersion. Due to the negative charge, small amounts of electrolytes or cationic ions present in the dispersion tend to flocculate the microcrystalline cellulose. Therefore, it is preferred to use deionized water in preparing an aqueous dispersion of the microcrystalline cellulose to prevent flocculation. Flocculation may also be retarded or prevented by using a protective colloid in combination with the microcrystalline cellulose. Suitable protective colloids include, but are not limited to, carboxymethyl cellulose, vegetable gums, such as gum acacia, carob bean gum, gum tragacanth and seaweed gums, such as carrageenin. When used, the protective colloid is present at levels of from about 5 to about 20 percent by weight of the microcrystalline cellulose.

Other stabilizing materials may be used in combination with the stabilizing agent of the invention to provide additional stabilization of the marshmallow product at the upper level of density within the range set forth, i.e., above a density of about 350 grams per pint. In particular, alginate derivatives, such as propylene glycol alginate and sodium alginate, have been found to be effective in stabilizing marshmallow products having a density above about 350 grams per pint.

In the method of the present invention, an aqueous gel is first prepared with the microcrystalline cellulose and water. Part of the sugar which is to be used in preparing the marshmallow product may also be incorporated into the aqueous gel to provide additional body. In preparing the aqueous gel, a substantial amount of attrition of the microcrystalline cellulose is required to establish the gel. In this respect, the microcrystalline cellulose is gradually added to water as the water is being thoroughly agitated. Attrition of the microcrystalline cellulose may then be effected by hydraulic or mechanical shear. In this connection, mechanical shear may be effected by use of a colloid mill. Hydraulic shear may also be used to effect attrition of the microcrystalline cellulose, and hydraulic shear may be accomplished by any commercially available high intensity hydraulic shear mixer, such as a Jones-Beloit mixer. The attrition of the micro-crystalline cellulose permits the crystalline aggregates to become hydrated and establishes the desired gel.

After an aqueous gel has been prepared, sugar is added to the aqueous gel, along with any additional stabilizers which are used. The sugar mixture is then heated to a temperature of from about 220° F. to about 240° F. to dissolve the sugar and provide a syrup. The syrup is then cooled and corn syrup may be added during the cooling process.

After the syrup has been cooled to a temperature of less than about 150° F. the whipping agent is added. As previously indicated, egg albumen is the preferred whipping agent, and the egg albumen is added as fresh egg whites or as reconstituted dried egg albumen. After addition of the egg albumen, the solids level of the mixture is adjusted to a desired level of less than about 80 percent and the mixture is whipped. It is preferred that the solids level be not lower than about 76 percent to prevent destabilization from occurring. The solids level of marshmallow and marshmallow creme heretofore produced is usually about 82 percent. At this level of solids air is easily incorporated into a marshmallow syrup and a stable foam is formed. By reducing the solids level in accordance with the invention a more fluid product with less overrun can be prepared but such product is inherently unstable. The stabilizing agent of the invention permits a stable, spoonable, flowable marshmallow product to be prepared.

Whipping may be effected by any suitable process, but it is preferred to use apparatus known as an Oakes continuous mixer. The whipped marshmallow is then pumped to a suitable heat exchanger, such as a Votator, and the marshmallow is reduced to a temperature of between about 95° F. and about 105° F. Thereafter, the whipped marshmallow product is packaged into suitable containers. A spoonable marshmallow product is provided having a density of between about 250 grams per pint and about 450 grams per pint. The marshmallow product remains spoonable and flowable during extended storage and no destabilization of the marshmallow product occurs.

The following example further illustrates various features of the present invention, which is defined in the appended claims.

EXAMPLE 33 gallons of corn syrup (63 DE, 44° Baumé) and 260 pounds of water are added to a jacketed kettle provided with a Jones-Beloit high shear hydraulic mixer. The mixer is turned on prior to addition of the corn syrup to prevent settling of the corn syrup to the bottom of the kettle. 43.5 pounds of micro-crystalline cellulose, available under the trade name Avicel, are then added to the kettle while the mixer is being operated. The mixer is operated for a sufficient time to hydrate the micro-crystalline cellulose and to form an aqueous gel. This requires about 20 minutes of mixing. A dry blend of 100 pounds of sucrose, 1.36 pounds of propylene-glycol alginate, 0.81 pound of sodium alginate, 4.69 pounds of cream of tartar and 2.34 pounds of sucrose and the dry blend are then added to the aqueous gel in the kettle as the mixer is operated. Steam is introduced into the jacket of the kettle and the mixture is then heated with constant agitation to a temperature of 234° F. to provide a syrup.

The heating is then stopped and 72 gallons of corn syrup (63 DE, 40° Baumé) is added. Cooling water is then run through the jacket of the kettle and the syrup mixture is cooled to a temperature of 140° F.

A dispersion of 28 pounds of dried egg albumen in 90 pounds of water is then added to the syrup mixture. The solids of the syrup mixture are adjusted to 78.5 percent and the syrup mixture is pumped to an Oakes continous beater. The syrup is then whipped to provide a density of 390 grams per pint. After leaving the Oakes beater, the marshmallow is cooled to a temperature of 100° F. and is packaged into glass jars. After cooling to room temperature, the marshmallow product is spoonable and flowable. The marshmallow product is stored for a period of six weeks and remains spoonable and flowable during this period, with no signs of destabilization of the product.

By the present invention, a unique spoonable and flowable marshmallow product is provided. The marshmallow product is stable, and remains flowable over extended periods of storage.

We claim:

1. A method for making a spoonable, flowable marshmallow product comprising providing a microcrystalline cellulose stabilizing agent, hydrating said stabilizing agent by preparing an aqueous dispersion of the microcrystalline stabilizing agent and subjecting said aqueous dispersion to hydraulic or mechanical shear, adding at least one sugar to said hydrated aqueous dispersion of said stabiliizng agent, and heating said aqueous dispersion to provide a syrup, preparing a marshmallow mixture from said syrup including said sugar, a whipping agent and said hydrated stabilizing agent, said marshmallow mixture having from about 76 percent to about 80 percent by weight of solids, and whipping said mixture to provide a stable, spoonable and flowable marshmallow product having a density of from about 250 to about 425 grams per pint, said stabilizing agent being present at a level sufficient to provide between about 0.5 and about 5.0 percent by weight, dry basis, of said stabilizing agent in said product.

2. A method in accordance with claim 1 wherein said marshmallow mixture also includes a protective colloid.

3. A method in accordance with claim 1 wherein said marshmallow mixture includes a further stabilizing agent selected from aliginate derivatives and wherein the marshmallow product has a density of at least about 350 grams per pint.

References Cited

UNITED STATES PATENTS 3,067,037   12/1962   Herald et al. _____ 99—139
3,206,315   9/1965    Anderson et al. ____ 99—134 A

OTHER REFERENCES

Daniel, A. R.: Up-To-Date Confectionery, Maclaren & Sons Ltd., Davis House, Surrey, England, 1965, p. 447.

RAYMOND N. JONES, Primary Examiner

J. M. HUNTER, Assistant Examiner